(12) United States Patent
Berenger et al.

(10) Patent No.: US 11,223,204 B2
(45) Date of Patent: Jan. 11, 2022

(54) ELECTRIC POWER SUPPLY METHOD AND ARCHITECTURE FOR ON-BOARD DOMESTIC NETWORK

(71) Applicant: LATELEC, Lahege Occitanie (FR)

(72) Inventors: Serge Berenger, Paris (FR); Gregoire Lemire, Toulouse Occitanie (FR); Yoann Rebiere, Ramonville Occitanie (FR)

(73) Assignee: Latelec, Labege Occitaine (FR)

(*) Notice: Subject to any disclaimer, the term of this patent is extended or adjusted under 35 U.S.C. 154(b) by 0 days.

(21) Appl. No.: 16/624,420

(22) PCT Filed: Jun. 19, 2018

(86) PCT No.: PCT/EP2018/066302
§ 371 (c)(1),
(2) Date: Dec. 19, 2019

(87) PCT Pub. No.: WO2018/234330
PCT Pub. Date: Dec. 27, 2018

(65) Prior Publication Data
US 2020/0220354 A1     Jul. 9, 2020

(30) Foreign Application Priority Data

Jun. 20, 2017 (FR) .................................. 1755597

(51) Int. Cl.
*H02J 3/38* (2006.01)
*B64D 11/00* (2006.01)
*H02J 5/00* (2016.01)

(52) U.S. Cl.
CPC ............... *H02J 3/38* (2013.01); *B64D 11/00* (2013.01); *H02J 5/00* (2013.01); *B64D 2221/00* (2013.01); *H02J 2310/44* (2020.01)

(58) Field of Classification Search
CPC . H02J 3/38; H02J 5/00; H02J 2310/44; B64D 11/00; B64D 2221/00
(Continued)

(56) References Cited

U.S. PATENT DOCUMENTS

| 2011/0210606 | A1 | 9/2011 | Selker |
| 2015/0326134 | A1* | 11/2015 | Jouper .................... B60R 16/02 307/9.1 |
| 2017/0126018 | A1 | 5/2017 | Buffenbarger |

FOREIGN PATENT DOCUMENTS

| DE | 102011121787 | 3/2013 |
| DE | 102014219788 | 3/2016 |

(Continued)

*Primary Examiner* — Hal Kaplan
(74) *Attorney, Agent, or Firm* — Defillo & Associates, Inc; Evelyn A Defillo

(57) ABSTRACT

The invention relates to the on-board electric power network architecture of a vehicle cabin using domestic devices, in particular of an aircraft cabin, including primary networks (11, 12) connected in parallel to a single domestic network (3) of the cabin for powering domestic devices via converter units (41, 42; 40). Measurement sensors (80) are arranged at the output of each converter unit (41, 42; 40) and the measurements are transmitted (L1) to a regulating device (9) for sharing the supply of the domestic network (3) according to the available power, each converter unit (41, 42; 40) comprises an upstream processing stage (E1) and a downstream processing stage (E2), each including an anti-disturbance device (D1, D2), linked (B1, B2) with the primary network (11, 12) and linked (B3, B4) with the domestic network (3), respectively. The anti-disturbance devices (D1, D2) are coupled with a set (7) of domestic level adapters (71, 72) distributed in the processing stages (E1, E2), the set of adapters (7) likewise including a neutral-line separator (73).

15 Claims, 3 Drawing Sheets

(58) Field of Classification Search
USPC .......................................................... 307/64
See application file for complete search history.

(56) References Cited

FOREIGN PATENT DOCUMENTS

| | | |
|---|---|---|
| EP | 2942696 | 11/2015 |
| FR | 3000468 | 7/2014 |
| FR | 3001443 | 8/2014 |
| WO | WO2016016041 | 2/2016 |

* cited by examiner

ELECTRIC POWER SUPPLY METHOD AND ARCHITECTURE FOR ON-BOARD DOMESTIC NETWORK

CROSS REFERENCE TO RELATED APPLICATION

This application is a national stage entry of PCT/EP2018/066302 filed Jun. 19, 2018, under the International Convention and claiming priority over French Patent Application No. FR 1755597 filed Jun. 20, 2017.

TECHNICAL FIELD

The invention relates to an electric power supply method and architecture for a domestic network placed on board a passenger cabin for electronic equipment requiring voltage levels similar to those of the terrestrial domestic type. This method and this architecture are implemented to particularly distribute the on-board power in the passenger cabins of aircraft from electric powers supplied by generators, with each generator being coupled to a propulsion engine. The invention also relates to an aircraft equipped with such an architecture, in particular to commercial airplanes with conventional electric generation that are in current operation or to a future generation.

The field of the invention relates to the domestic electric power supply in the on-board electric networks, and more specifically to the domestic power supply in the aircraft cabins. The invention is also applicable to the electric systems on board any type of transport vehicle, including motor vehicles, railway or maritime transport.

The domestic loads of the cabin system relate to the loads of equipment that is not critical for managing the transport. In this category, the loads for general public personal electronic equipment owned by the passengers, the passenger In-Flight Entertainment system (IFE), and the comfort equipment (individual lighting, ventilation, cooking installations or "galleys", etc.) can be cited. The power supply for these loads is provided in two forms: alternating voltages of 230 V at 50 Hz, which is the widespread distribution in Europe, or of 120 V at 60 Hz for the standard distribution in the USA for personal electronic equipment and aeronautics type alternating voltages of 115 V at 400 Hz and direct voltages of 28 V for the IFE system and the comfort equipment.

In order to power the loads of the domestic equipment, the electric networks of the on-board systems thus distribute through direct/alternating (DC/AC) or alternating/alternating (AC/AC) current type converters in order to locally create voltage levels that are adapted to the domestic equipment.

In the avionics application in particular, electric distribution networks power the technical equipment of the avionics systems that are critical for flight management (the landing gear actuators, the air conditioning system compressors, the pumps of the hydraulic circuits of the pressurization system, etc.), as well as the equipment, called domestic equipment, (IFE system and comfort equipment) of the cabin system, which is not critical for this management and which is mentioned above.

At source, the generators of the aircraft, which are driven by the propulsion engines on each wing of the aircraft, conventionally supply currents (AC) of regulated three-phase voltages of 115 and 230 volts at frequencies of 400 Hz or at frequencies within the range of 360-800 Hz, and a voltage of 28 volts of direct current (DC) via rectifiers. The electric power is then distributed from electric power centers over busbars of primary distribution networks forming the avionics network, then redistributed over the airplane systems, from secondary electric boxes, into secondary distribution networks made up of busbars, of cables and of harnesses. The technical equipment of the airplane systems, distributed over the various busbars according to their location and their load, is designed with respect to the voltage and frequency levels supplied by the secondary networks.

In this avionics application, the power supply for loads for domestic type equipment is produced locally from the secondary distribution networks using DC/AC or AC/AC converters requiring intermediate components for modifying the power electronics (inverters, converters, transformers, etc.).

PRIOR ART

It is known for the power supply for high-power loads, for technical loads, to be managed by the one and the same primary and secondary electric distribution network. This management is illustrated, for example, in patent document EP 2432093, which recommends the use of a single primary power distribution busbar coupled to a secondary converter integrated in each secondary power center in order to supply the adapted voltage to the equipment of the airplane systems connected to this secondary power center. Furthermore, patent documents FR 3005377 or U.S. Pat. No. 7,950,606 make provision for increasing the number of secondary power centers in order to locate them as close as possible to the loads to be powered. These solutions do not allow the adaptation of the power supply of domestic equipment to be improved.

Furthermore, increasing the number of conversions locally in order to power the domestic equipment limits the amount of personal electronic equipment that can be used by the passengers, while the number and the diversification of such equipment (smartphones, tablets, cameras, portable computers, virtual reality helmets, etc.) increases considerably.

Furthermore, this increase in the number of specific and local converters from the primary and secondary distribution networks raises the problem of compliance with the quality criteria, in terms of the harmonic distortion factor, of the frequency level of the alternating voltages, of the variation in voltage level, of the power factor, etc., of the primary and secondary networks, with the risk of pollution increasing with the number of converters.

Furthermore, the conversion architectures integrated locally do not facilitate the reconfiguration of the passenger cabins that is involved when fleets are re-fitted without calling into question airplane certifications.

Furthermore, the solutions of the prior art are forced, in order to redistribute the electric power in the cabin networks, to convert the electric power supplied by the primary distribution network into voltage and frequency within the context of avionics protection standards. However, these standards govern the safety of high-power distribution for high-load equipment (landing gear actuators, air conditioning compressors, pumps, wing unit deicing actuators, etc.) and the conversions then require the use of oversized power electronics equipment (for example, auto-transformers) in order to be able to ensure compliance with the certification standards.

DISCLOSURE OF THE INVENTION

The invention aims to overcome these disadvantages, in particular it aims to allow adaptation to a significant amount of general public electronic equipment, whilst complying with the quality criteria for the electric power supply thereof without disrupting those of the avionics network, or, more generally, of the primary networks, whilst facilitating the power supply reconfigurations during cabin refits.

To this end, the invention makes provision for powering the general public electronic equipment from a distribution over a domestic network connected as close as possible to the generators via an adapted conversion so as not to depend on the sizing of the intermediate components (rectifiers, capacitors, etc.).

To this end, the subject matter of the present invention is an electric power supply method for a domestic network placed on board a passenger cabin using equipment, called domestic equipment, requiring voltage levels of the terrestrial domestic type. With the primary electric power sources being supplied over at least two primary networks, the method comprises:

connecting the primary networks in parallel to a single on-board domestic network for powering said domestic equipment in the cabin through interfaces for converting primary alternating current into domestic level voltage and frequency, with each primary network being coupled to the domestic network through at least one interface;

parallelizing the conversion interfaces by a measurement of the level data of the electric parameters supplied by each interface for regulating the sharing of the primary power sources according to their availability and supplying a consistent service level over the domestic network; and maintaining the criteria for the quality of each primary network and for the domestic quality of the domestic network by filtering, level compensating and correcting the power factor in each conversion interface linked upstream with each primary network and linked downstream with the domestic network.

Applying the present solution to the various types of airplanes that make up a fleet also results in ease of management and of modification of the fleet. Advantageously, the passenger cabin then integrates a network that has a natural capability to accommodate any type of equipment carried by the passengers.

Furthermore, the issues of obsolescence associated with uncontrolled electric power are removed.

According to preferred embodiments:

each conversion interface integrates a galvanic isolation electric transformation splitting the avionics neutral point of the corresponding primary network and the neutral point of the domestic network;

advantageously, an output of the electric transformation self-powers each conversion interface and the neutral point of the domestic network is floating;

each conversion interface comprises two functional stages, respectively upstream and downstream of the galvanic isolation, with each functional stage comprising two adaptation levels, one level dedicated to maintaining quality criteria respectively associated with the primary network and the domestic network, and one level for voltage and/or frequency conversion associated with the galvanic isolation;

a maximum extractable current intensity setpoint can be supplied to each conversion interface on the basis of the electric power data available on each primary electric power source;

the level data of the electric parameters supplied by each conversion interface are shared between the conversion interfaces and this sharing regulates the contribution of each power source at each interface according to its availability;

the level data of the electric parameters are centralized in order to regulate the sharing of the power sources in order to provide a consistent and constant service level over the on-board domestic network;

the level data of the electric parameters are processed independently by each conversion interface that regulates the transmission of power supplied by the corresponding source;

at least one auxiliary electric power supply 101, 102 is used to supply electric power to the on-board domestic network according to the availability of the electric power of the primary networks.

The invention also relates to an electric power supply network architecture for a vehicle cabin using equipment, called domestic equipment, requiring voltage levels of the terrestrial domestic type. This architecture comprises at least two primary networks for distributing electric power, with each primary network being powered by an electric generator. In this architecture, the primary networks are connected in parallel to a single cabin domestic network for powering said domestic equipment via converter units, with at least one converter unit per primary network. Sensors for measuring voltage, current intensity, frequency and power factor are arranged at the output of each converter unit and the measurements are transmitted to a regulating means for sharing the power supply of the domestic network according to the power available in each primary network.

Each converter unit comprises an upstream power processing stage and a downstream power processing stage, each integrating an anti-disturbance device for filtering, compensating and protecting the electric network, respectively linked with the corresponding primary network and linked with the domestic network. The anti-disturbance devices are coupled to a set of adaptors for adapting the voltage and frequency of domestic levels, distributed in the power processing stages, said set of adaptors also integrating a neutral line splitter between the primary networks and the domestic network.

According to preferred embodiments:

each set of adaptors comprises, in the upstream processing stage, a frequency modulator linked downstream with the anti-disturbance device via a primary power transmission bus and, in the downstream processing stage, a voltage converter linked upstream with the anti-disturbance device via a power transmission cabin bus;

a galvanic isolating transformer couples the voltage and frequency adaptors and acts as a splitter between neutral lines of the primary bus, on the one hand, and of the cabin bus, on the other hand, the neutral lines being respectively connected to an avionics neutral point of the primary network and to a floating neutral point of the domestic network;

advantageously, each galvanic isolating transformer ensures self-powering for the corresponding converter unit and the neutral of the domestic network is kept floating;

the regulating means for sharing the power supply of the domestic network is selected between:

an interconnection between local data processing and regulation control units, integrated in each converter unit and connected in a servo-control loop to the measurement sensors and to the power transmission buses of said converter unit;

a centralized data processing and regulation control unit connected to the measurement sensors of all the converter units; and local management by each local data processing and regulation control unit linked with the measurement sensors of the corresponding converter unit;

each anti-disturbance device comprises inductive and/or capacitive type filters and at least one power factor corrector;

the regulating means controls contactors distributed upstream and downstream of each converter unit over the corresponding buses, as well as circuit breakers of the anti-disturbance devices of each converter unit;

in the upstream processing stage, the adaptor is a frequency modulator, in particular between 10 kHz and 1 MHz, and, in the downstream processing stage, the adaptor is a voltage converter;

the links between the generators and the converter units are formed by buses, with the cabin domestic network being structured around a domestic bus.

Throughout this document, the term "domestic" relates to the equipment of a cabin network that is not critical for flight management. The qualifiers "upstream" and "downstream" relate to the direction of electric propagation of the power links.

DESCRIPTION OF THE FIGURES

Further information, features and advantages of the present invention will become apparent upon reading the following non-limiting description, with reference to the accompanying figures, which respectively show.

DETAILED DESCRIPTION

In the following description, identical reference signs relate to the same element and refer to the passage(s) of the text that describe(s) said element.

Figure 1:
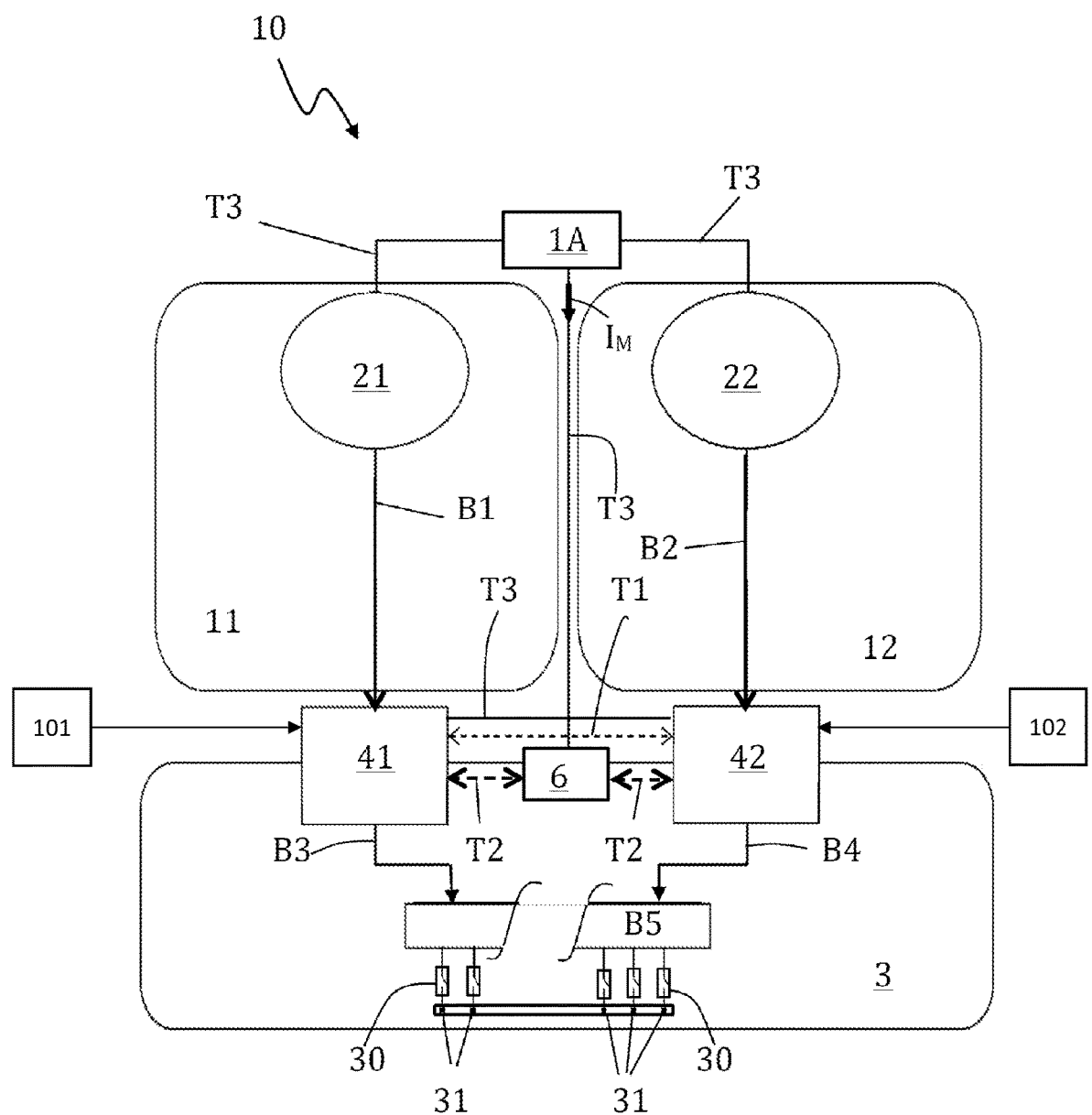
FIG. 1, a functional block diagram of an embodiment of a network architecture for powering a domestic network placed on board an aircraft cabin by primary electric power generation networks via converter units according to the invention.

With reference to the block diagram of a network architecture of FIG. 1, the illustrated architecture 10 comprises two primary networks 11 and 12 for electric power distribution, with each primary network 11, 12 being powered by an electric generator 21, 22 coupled to a propulsion engine (not shown) of a twin-engine aircraft. The generators supply, for example, avionics power at a three-phase voltage of 115 volts at 400 Hz.

In this architecture 10, the primary networks 11, 12 are connected in parallel to a single cabin domestic network 3, intended to power domestic equipment sockets 31 in the passenger cabin, via voltage and frequency converter units 41 and 42. The sockets 31 are protected by contactors 30.

The link between each generator 21, 22 and each corresponding converter unit 41, 42 is provided by a primary transmission bus for alternating three-phase current called "primary bus" B1, B2. Furthermore, the links between the converter units 41, 42 and the domestic network 3 are respectively implemented by transmission buses toward the cabin, called "cabin bus" B3 and B4, connected at one end to the converter units 41, 42 and at their other end to a domestic bus B5 for powering the domestic cabin network 3.

The converter units 41, 42 are thus parallelized in order to directly power the domestic network bus B5 in parallel. The domestic bus B5 thus powers the domestic cabin network 3 with domestic level alternating current, with single-phase current with a voltage of 230 volts at 50 Hz in the example, in order to distribute the electric power to the domestic equipment of the cabin, IFE equipment in this example. The converter units 41, 42 are designed to transform the avionics electric power of the primary networks 11, 12 into domestic voltage and frequencies. An example of a converter unit is described hereafter with reference to FIG. 2.

Furthermore, the converter units 41 and 42 are interconnected by a two-way data transmission link T1, in order to form a regulation for sharing the power supply between the primary networks 11 and 12 according to the availability of power in the transmission buses B1 and B2. Such a regulation distributed in the converter units 41, 42 is also described with reference to FIG. 2. By way of a variant, the sharing of the power supply between the primary networks 11 and 12 is regulated by a centralized data processing and control unit 6 connected to each converter unit 41, 42 by two-way transmission links T2.

Advantageously, a maximum extractable intensity current setpoint $I_M$ is supplied to each converter unit 41, 42 from the available electric power data detected on each primary electric power generator 21, 22. In general, the electric power available on each generator 21, 22 is supplied by an avionics management unit 1A that manages all the flight data and assesses the value of the setpoint $I_M$.

The setpoint $I_M$ is then transmitted via links T3 to each converter unit 41, 42, or to the unit 6 in the case of centralized data processing and regulation control. The transmission of a maximum current setpoint is particularly useful in the event that the aircraft operates in degraded mode.

Figure 2:
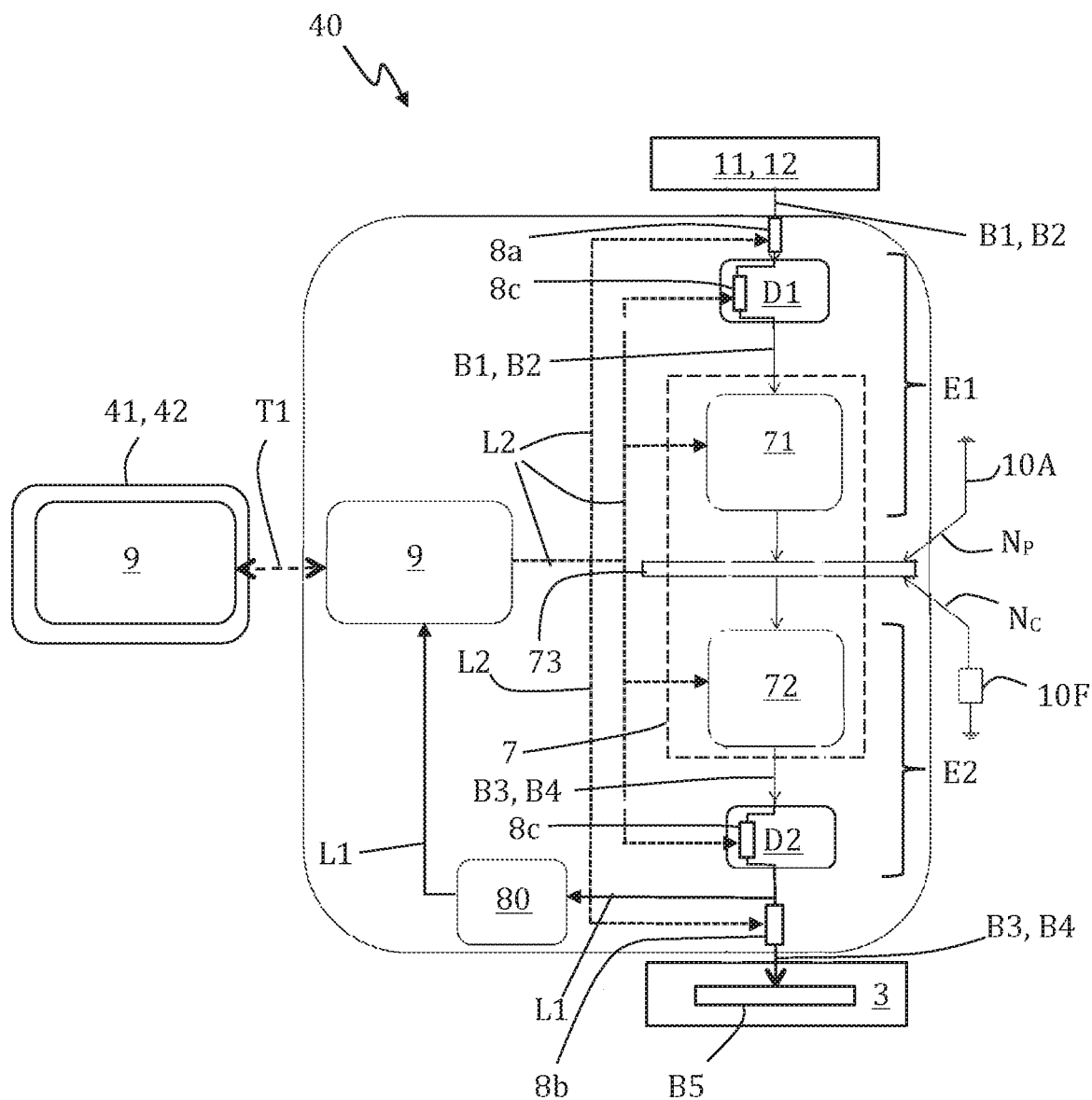
FIG. 2, a functional block diagram of a converter unit of the example of an architecture according to FIG. 1.

With reference to the functional block diagram of FIG. 2, a converter unit 40, which represents either one of the converter units 41 and 42 of the example of an architecture 10 of FIG. 1, is shown in detail. A converter unit 40 comprises two power processing stages, an upstream input stage E1 and a downstream output stage E2. The processing stages E1 and E2 respectively integrate anti-disturbance devices D1 and D2 for filtering, level compensating and protecting the electric network, linked upstream with the primary network 11, 12 via the corresponding bus B1, B2, and respectively linked downstream with the domestic network 3 via the corresponding bus B3, B4. The devices D1 and D2 in a known manner integrate inductive and capacitive filters, circuit breakers, contactors and power factor correctors. Such devices are intended to comply with the quality criteria of the upstream or downstream networks: low harmonic distortion factor, maintenance of the frequency level or of the voltages, etc.

The anti-disturbance devices D1 and D2 are coupled to a set 7 of voltage and frequency adaptors 71 and 72 via the upstream primary bus B1, B2 and the downstream cabin bus B3, B4. The adaptors 71 and 72 are respectively integrated in the upstream E1 and downstream E2 power processing stages and are coupled together by a galvanic isolation transformer 73.

This transformer 73 splits the neutral lines $N_P$ and $N_C$ and thus splits the avionics neutral point 10A of the primary network 11, 12 from the floating neutral point 10F of the domestic network 3. This splitting of the neutral points of the primary networks 11, 12 and of the domestic network 3 enables reliable splitting of the primary network 11, 12 with the domestic network 3, so that a fault on the primary network 11, 12 does not affect the domestic network 3, and vice versa. Furthermore, the galvanic isolation transformer 73 advantageously ensures self-powering of the corresponding converter unit 41, 42 integrating said transformer.

In the illustrated embodiment, the adaptor 71 is a high-frequency modulator, in the 10 kHz to 1 MHz range, linked downstream with the anti-disturbance device D1, with the adaptor 72 being a voltage converter linked upstream with the anti-disturbance device D2 and operating as a current source for the cabin domestic network 3. The voltage, the frequency and the phase of the converter 72 are thus slaved to the reference voltage of the domestic bus B5, 230 V/50 Hz in the embodiment.

Sensors 80 for measuring voltage, current intensity, frequency and power factor are arranged at the downstream output of each converter unit 40, at the downstream output of the anti-disturbance device D2 in the illustrated embodiment. The measurements are transmitted by a servo-control loop link L1 to a local unit 9 for processing measured data and for regulation control.

The local units 9 of each converter unit 40 are interconnected by the two-way data transmission link T1 in order to form a decentralized regulation of the sharing of the power sources between the primary networks 11, 12 according to their availability. The local unit 9 controls the opening/closing of the contactors 8a, 8b arranged upstream and downstream of each converter unit 40, circuit breakers 8c of the anti-disturbance devices D1 and D2, as well as the voltage and frequency adaptors 71, 72. The data transmission link L1 forms servo-control loops with the control links L2, of the local unit 9 with the contactors 8a, 8b, the circuit breakers 8c and the voltage and frequency adaptors 71, 72, and the power links formed by the buses B1, B2 and B3, B4.

By way of a variant, the local units 9 can be based on a centralized data processing and control unit, like the centralized unit 6 of FIG. 1, which then controls the contactors 8a, 8b and the circuit breakers 8c. Alternatively, each local unit 9 for processing data and for regulation control performs, in association with the measurement sensors 80 of the corresponding converter unit 40, local independent management.

Figure 3:
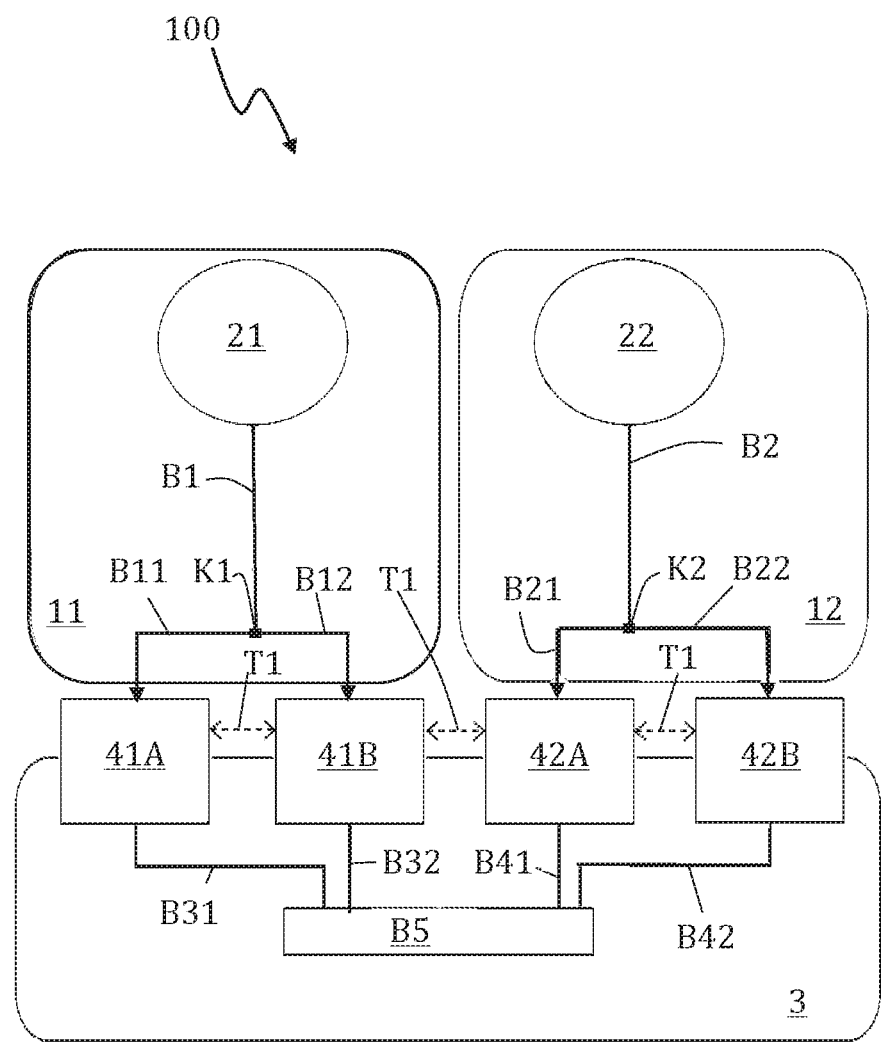
FIG. 3, a block diagram of a variant of the architecture of FIG. 1 with two converter units per primary network.

The block diagram of FIG. 3 shows a variant of the architecture 100 of FIG. 1 with two converter units 41A, 41B and 42A, 42B for each primary network 11, 12. In this architecture 100, which uses the basic structure of the architecture 10, each primary bus B1, B2 is divided into two secondary buses B11, B12 and B21, B22 by bus couplers K1 and K2. The links between the converter units 41A, 41B, 42A, 42B and the domestic network 3 are respectively implemented by transmission cabin buses, respectively B31, B32, B41 and B42, which power the bus B5 of the cabin domestic network 3.

In this embodiment, each converter unit 41A, 41B, 42A, 42B is interconnected with another converter unit by the two-way data transmission links T1. On the basis of the data shared via the links T1, the regulation of power supply sharing between the primary networks 11 and 12, according to their power availability, is distributed in the converter units 41A, 41B and 42A, 42B in a similar manner to the distributed regulation of the architecture 10 with reference to FIG. 1. By way of a variant, the power supply sharing between the primary networks 11 and 12 is regulated by a centralized unit or alternatively by local units, as described above with reference to FIG. 2.

The invention is not limited to the embodiments described and shown. Thus, auxiliary electric current sources can be mounted in parallel with the converter units also considered to be current sources, in particular, fuel cells, solar collectors, batteries, in order to provide the domestic network with power according to the availability of the primary sources.

Furthermore, during operation this architecture enables a consistent power service function to be provided in the cabin during a reconfiguration of the airplane network (for example, during the loss of a generator) by virtue of the parallelization of the converter units that allows a single domestic network to be powered that is equally powered by the generators. The reconfigurations of the network can be associated with the operating phase of the aircraft (on the ground, take off, flying, landing) or with intrinsic factors of the network that can occur during flight. Since various breakdown cases are anticipated in the data processing means of the regulator (major fault on the primary network, loss of control of a converter, etc.), these processing means control the opening of the suitable contactors according to the detected situation that is considered to be a breakdown.

Moreover, the decoupling between the loads of the airplane systems, which are associated with the certification, and those associated with the functions of the cabin is only performed once per airplane type.

With respect to the galvanic isolation transformer, said transformer can also fulfill a role of transforming the voltage level.

With respect to the anti-disturbance devices, the compensation means can comprise means for automatically shedding loads in the event of a voltage drop.

Furthermore, the power supply of the domestic loads can result from conversions of alternating or direct voltage from corresponding buses or from the combination of the two conversions as described above.

Advantageously, with the aircraft having two available alternating (for example, 115 V at 400 Hz) and direct (for example, 28 V) voltage levels, it is possible to obtain a domestic alternating current, for example, 230 V at 50 Hz, either from the alternating voltage, as in the present invention, or from the direct voltage using a DC/AC conversion inverter.

With respect to the measurement sensors, they can be located at the output of the converter units or at the end of the domestic network, in order to take into account the voltage drops. In the event of independent self-regulation by each converter unit, the sensors are located in the vicinity of each of these units.

The invention claimed is:

1. An electric power supply method for a domestic network placed on board a passenger cabin using a domestic equipment, requiring voltage levels of a terrestrial domestic type, the method comprising with primary electric power sources being supplied over at least two primary networks:
   connecting the primary networks in parallel to a single on-board domestic network for powering said domestic equipment in the cabin through interfaces for converting primary alternating current into domestic level voltage and frequency, with each primary network being coupled to the domestic network through at least one interface;
   parallelizing the conversion interfaces by a measurement of a level data of electric parameters supplied by each interface for regulating a sharing of the primary power sources according to their availability and supplying a consistent service level over a domestic network;
   maintaining a quality criterion of each primary network and for a domestic quality of the domestic network by filtering, compensating a level and correcting a power factor in each conversion interface linked upstream with each primary network and linked downstream with the domestic network; and wherein each conversion interface integrates a galvanic isolation electric transformer splitting an avionics neutral point of a corresponding primary network and a neutral point from one of the primary networks.

2. The electric power supply method as claimed in claim 1, wherein each conversion interface comprises two functional stages, respectively upstream and downstream of the galvanic isolation, with each functional stage comprising two adaptation levels, one level dedicated to maintaining quality criteria respectively associated with the primary network and the domestic network, and one level for voltage and/or frequency conversion associated with the galvanic isolation.

3. The electric power supply method as claimed in claim 1, wherein a maximum extractable current intensity setpoint is supplied to each conversion interface on the basis of an electric power data available on each primary electric power source.

4. The electric power supply method as claimed in claim 1, wherein the level data of the electric parameters supplied by each conversion interface are shared between the conversion interfaces and this sharing regulates the contribution of each power source at each interface according to its availability.

5. The electric power supply method as claimed in claim 1, wherein the level data of the electric parameters are centralized in order to regulate the sharing of the power sources in order to provide a consistent and constant service level over the on-board domestic network.

6. The electric power supply method as claimed in claim 1, wherein the level data of the electric parameters are processed independently by each conversion interface that regulates the transmission of power supplied by the corresponding source.

7. The electric power supply method as claimed in claim 1, wherein at least one auxiliary electric power supply is used to supply electric power to the on-board domestic network according to the availability of the electric power of the primary networks.

8. An electric power supply network architecture for a vehicle cabin using a domestic equipment, requiring voltage levels of a terrestrial domestic type, wherein at least two primary networks for distributing electric power are each powered by an electric generator, wherein the primary networks are connected in parallel to a single cabin domestic network for powering said domestic equipment via converter units, with at least one converter unit per primary network, wherein sensors for measuring voltage, current intensity, frequency and power factor are arranged at the output of each converter unit and the measurements are transmitted to a regulating device for sharing the power supply of the domestic network according to the power available in each primary network, wherein each converter unit comprises an upstream power processing stage and a downstream power processing stage, each integrating an anti-disturbance device for filtering, compensating and protecting the an electric-network, respectively linked with the corresponding primary network and linked with the domestic network, and wherein the anti-disturbance devices are coupled to a set of adaptors adapting the voltage and frequency of domestic levels distributed in the power processing stages, said set of adaptors also integrating a neutral line splitter between the primary networks and the domestic network.

9. The network architecture as claimed in claim 8, wherein each set of adaptors comprises, in the upstream processing stage, a frequency modulator linked downstream with the anti-disturbance device via a primary power transmission bus and, in the downstream processing stage, a voltage converter linked upstream with the anti-disturbance device via a power transmission cabin bus.

10. The network architecture as claimed in claim 9, wherein a galvanic isolating transformer couples the voltage and frequency adaptors and acts as a splitter between neutral lines of the primary bus, on the one hand, and of the cabin bus, on the other hand, the neutral lines being respectively connected to an avionics neutral point of the primary network and to a floating neutral point of the domestic network.

11. The network architecture as claimed in claim 8, wherein the regulating device for sharing the power supply of the domestic network is selected from the group consisting of:
an interconnection between local data processing and regulation control units, integrated in each converter unit and connected in a servo-control loop to the measurement sensors and to the power transmission buses of said converter unit;
a centralized data processing and regulation control unit connected to the measurement sensors of all the converter units; and
local management by each local data processing and regulation control unit linked with the measurement sensors of the corresponding converter unit.

12. The network architecture as claimed in claim 8, wherein each anti-disturbance device comprises 1) at least one of an inductive filter and a capacitive filters and 2) at least one power factor corrector.

13. The network architecture as claimed in claim 8, wherein the regulating device controls contactors distributed upstream and downstream of each converter unit over the corresponding buses, as well as circuit breakers of the anti-disturbance devices of each converter unit.

14. The network architecture as claimed in claim 8, wherein, in the upstream processing stage, the adaptor is a frequency modulator and, in the downstream processing stage, the adaptor is a voltage converter.

15. An aircraft equipped with a network architecture as claimed in claim 8, wherein each electric generator is coupled to a propulsion engine.

* * * * *